(12) United States Patent
Nakayama et al.

(10) Patent No.: US 7,666,926 B2
(45) Date of Patent: Feb. 23, 2010

(54) METHOD OF MAKING A PHOTOCATALYTIC MATERIAL

(75) Inventors: Tsuruo Nakayama, Saitama (JP); Nobukazu Motojima, Yamanashi (JP); Toru Yokomizo, Tokyo (JP)

(73) Assignee: NBC Meshtec, Inc., Tokyo (JP)

( * ) Notice: Subject to any disclaimer, the term of this patent is extended or adjusted under 35 U.S.C. 154(b) by 0 days.

(21) Appl. No.: 12/216,785

(22) Filed: Jul. 10, 2008

(65) Prior Publication Data

US 2009/0005234 A1 Jan. 1, 2009

Related U.S. Application Data

(62) Division of application No. 10/547,551, filed as application No. PCT/JP2004/002200 on Feb. 25, 2004, now Pat. No. 7,585,903.

(30) Foreign Application Priority Data

Mar. 5, 2003 (JP) ............... 2003-058560

(51) Int. Cl.
  *C03C 25/28* (2006.01)
  *B01J 20/26* (2006.01)
(52) U.S. Cl. ........................ 523/203; 502/402; 428/447; 428/448
(58) Field of Classification Search ........................ None
See application file for complete search history.

(56) References Cited

U.S. PATENT DOCUMENTS 2,952,595 A 9/1960 Jordan et al.
3,471,435 A 10/1969 Miller
3,578,629 A 5/1971 McManimie
4,749,727 A 6/1988 Tsuchiya
6,048,910 A 4/2000 Furuya et al.
7,153,571 B2 * 12/2006 Allermann .................. 428/391

FOREIGN PATENT DOCUMENTS

| JP | 2000-17230 | 1/2000 |
|---|---|---|
| JP | 2000-169755 | 6/2000 |
| JP | 2001-98220 | 4/2001 |
| JP | 2002206021 | 7/2002 |
| WO | 2004014971 | 2/2004 |

OTHER PUBLICATIONS

Yoshinaga, K., "Functionalization of Inorganic Colloidal Particles by Polymer Modification", Bull. Chem. Soc. Jpn., 75, 2002, 2349-2358.
International Search Report issued in International Application No. PCT/JP2004/002200 on Apr. 23, 2004.
English Translation of International Preliminary Report on Patentability issued in International Application No. PCT/JP2004/002200 on Feb. 13, 2006.

\* cited by examiner

*Primary Examiner*—Melvin C Mayes
*Assistant Examiner*—Sarah Van Oudenaren
(74) *Attorney, Agent, or Firm*—Wenderoth, Lind & Ponack, LLP.

(57) ABSTRACT

A method of making a photocatalytic material comprising a base substance and photocatalytic particles bonded on the base substance by chemical bonding through a silane compound. The chemical bonding is bonding a reactive group of the silane compound through graft polymerization to a radical produced on a resin surface of the base substance by irradiating radiation ray. The resulting photocatalytic material has the advantage that, even when used over a long time, the photocatalytic particles are less apt to shed and the resin base is less apt to deteriorate.

2 Claims, No Drawings

METHOD OF MAKING A PHOTOCATALYTIC MATERIAL

This application is a divisional application of U.S. application Ser. No. 10/547,551, filed Sep. 1, 2005, which is a national stage application of PCT/JP2004/002200, filed Feb. 25, 2004 and has issued as U.S. Pat. No. 7,585,903.

FIELD OF INVENTION

The present invention relates to a photocatalytic material formed through a chemical bonding of a photocatalytic particles inducing various reactions such as odor eliminating, sterilization of microorganism, and elimination of hypodense nitrogen oxide.

BACKGROUND ART

The photocatalytic particles induce several effects such as antifouling effect, defogging, bactericidal effect, odor eliminating and air purification by high reducing power of photo-excited electron and high oxidation power of electron hole. Therefore, the photocatalytic particles are developed in various fields such as articles for daily use, building products and civil engineering. Visible light reaction type photocatalytic particles reacting to visible light are developed recently and can be used in the room in which the amount of ultraviolet ray is low.

In order to use the beneficial effects of the photocatalytic particles in various fields such as articles for daily use, building products and civil engineering, it is necessary to bond the photocatalytic particles tenaciously on the various base substrate in such a manner that photocatalytic function is maintained and does not cause a negative effect on the base substrate.

When the base substrate on which the photocatalytic particles are bonded is made from resin, the resin base substrate deteriorates due to high oxidation power of the photocatalytic particles. Therefore the following problems are caused. That is, the photocatalytic function is decreased by eliminating the photocatalytic particles from the base substrate and the resin base substrate does not fulfill one's original function.

When the photocatalytic particles are bonded on the surface of the fiber, film and molding body made from resin, the bonding method of the photocatalytic particles which represses deterioration of resin is an important technique in terms of usefulness.

Conventionally, as the method for bonding the photocatalytic particles on the resin base substrate, there are the methods with organic binder such as fluorine resin or silicone resin which is hardly to deteriorate against high oxidation power of photocatalytic particles (See Patent Documents 1 and 2) The methods for preventing the photocatalytic particles from contacting with the resin base substrate were disclosed. For examples, the methods in which inorganic membrane made from silicon-oxide ($SiO_x$) or aluminum oxide is formed on the surface of the resin base substrate through sputtering method was disclosed (See Patent Documents 3 to 5).

When the fluorine resin consisted of tetrafluoroethylene which has the highest oxidation resistance is used as binder, it is difficult to bond the photocatalytic particles on the surface of the resin base substrate. Therefore, in order to improve adhesiveness of the photocatalytic particles, thermosetting resin is added thereto. When resin containing carbon hydride is added together with fluorine resin, the resin containing carbon hydride is dissolved by high oxidation power of the photocatalytic particles. Therefore, chromatism and afoul smell are caused. When silicone resin is used as binder, it is difficult to secure adhesiveness of the photocatalytic particles and the resin base substrate and to form uniform fixed layer of the photocatalytic particles depending on the component of the silicone resin.

On the other hand, in order to prevent the photocatalytic particles from contacting with the resin base substrate, the method in which dense inorganic membrane made from oxides of silicone or aluminum oxide is formed on the surface of the resin base substrate through sputtering method is disclosed. However, it is difficult to form the inorganic membrane having excellent adhesiveness depending on the difference of thermal expansion coefficient between the resin base substrate and the inorganic membrane and depending on the component of the resin. Furthermore, the resin base substrate change shape due to heat produced in sputtering method and productivity is decreased. Thus there are several problems as mentioned above, which need to be solved.

(Patent Document 1:
Japanese Patent Application Laid-Open No.H10 (1998)-216210)
(Patent Document 2:
Japanese Patent Application-Laid-Open No.H10 (1998)-001879)
(Patent Document 3:
Japanese Patent Application Laid-Open No.H08 (1996)-215295)
(Patent Document 4:
Japanese Patent Application Laid-Open No.H10 (1998)-17614)
(Patent Document 5:
Japanese Patent Application Laid-Open No. 2002-248355)

DISCLOSURE OF THE INVENTION

The present invention is to provide a photocatalytic material in which photocatalytic particles are bonded tenaciously to a resin base substrate in such a manner that the photocatalytic function is not impaired, and to provide the photocatalytic material repressing the elimination of the photocatalytic particles and deterioration of the resin base substrate even when the photocatalytic material is used over long.

In order to achieve the above described purpose, the photocatalytic material of the present invention comprises the following structure.

The present invention is to provide the photocatalytic material comprising a base substance, and photocatalytic particles bonded on the base substance by chemical bonding through silane compound.

Furthermore, the present invention is to provide the photocatalytic material, wherein the chemical bonding through the silane compound is graft polymerization.

Furthermore, the present invention is to provide the photocatalytic material, wherein the graft polymerization is radiation-induced graft polymerization.

BEST MODE FOR CARRYING OUT THE INVENTION

Hereinafter, preferred embodiment of the present invention will be concretely described. The photocatalytic particle used in the photocatalytic material of the present invention is a particle inducing photocatalytic function by irradiating light of wavelength having energy more than band-gap energy thereof. The photocatalytic particle is made from a mixture containing one or more of known metallic compound semiconductors such as titanium oxide, zinc oxide, tungsten oxide, iron oxide, strontium titanate, cadmium sulfide and cadmium selenide. Wherein, titanium oxide is preferably used, because it has favorite transparency and endurance and is harmless.

The crystal structure of titanium oxide includes rutile-type, anatase-type, brookite-type or amorphous-type. $TiO_{2-x}N_x$ and $TiO_{2-x}$ (x is equal to or less than 1) may. be used. Wherein, $TiO_{2-x}N_x$ is that at least one atom of oxygen in titanium oxide is substituted by nitrogen atom serving as anion. $TiO_{2-x}$ is that oxygen atom is lacking and is significantly far from stoichiometry.

In order to increase photocatalytic function, it may be possible to provide metallic compound or metal such as vanadium, copper, nickel, cobalt, chrome, palladium, silver, platinum and gold on the surface of the photocatalytic particles or in the photocatalytic particles.

Adsorbent may be used together with the photocatalytic particles. Therefore, it is possible to increase odor eliminating performance and removal performance of contaminants in the atmosphere. The adsorbent preferably includes carbonaceous adsorbent such as activated carbon, zeolitic adsorbent, metal oxide adsorbent such as molecular sieve, apatite, alumina, silicon oxide, and chelate resin.

According to the present invention, photocatalytic particles are bonded on the resin base substrate through chemical bonding. The material used in the chemical bonding is silane compound. Example of silane compound includes silane coupling agent represented by $X-Si(OR)_3$. X is functional group reacting chemically with organic matter, such as vinyl group, epoxy group, styryl group, methacrylo group, acryloxy group, isocyanate group, polysulfide group, amino group, mercapto group and chlor group. R is hydrolyzable group such as methoxyl group and ethoxyl group. Alkoxyl group including methoxyl group and ethoxyl group is hydrolyzed to form silanol group. The functional group including unsaturated bond, such as silanol group, vinyl group, epoxy group, styryl group, methacrylo group, acryloxy group and isocyanate group is known as a highly reactive group. In the photocatalytic material of the present invention, the photocatalytic particles are bonded on the surface of the base substrate through the chemical bonding by using the highly reactive silane coupling agent.

The silane coupling agent which can be used in the present invention includes vinyl trichloro silane, vinyl trimethoxy silane, vinyl triethoxy silane, vinyl triacetoxy silane, N-β-(N-vinyl benzyl amino ethyl)-γ-amino propyl trimethoxy silane, N-(vinyl benzyl)-2-aminoethyl-3-amino propyl trimethoxy silane hydrochloride, 2-(3,4epoxy cyclohexyl)ethyl trimethoxy silane, 3-glycidoxypropyl trimethoxy silane, 3-glycidoxypropyl methyl diethoxy silane, 3-glycidoxypropyl triethoxy silane, p-styryl trimethoxy silane, 3-methacryloxypropyl methyl dimethoxy silane, 3-methacryloxypropyl trimethoxy silane, 3-methacryloxypropyl methyl diethoxy silane, 3-methacryloxy propyl triethoxy silane, 3-acryloxy propyl trimethoxy silane, 3-isocyanate propyl triethoxy silane, bis(triethoxy silyl propyl) tetrasulfide, 3-amino propyl trimethoxy silane, 3-aminopropyl triethoxy silane, 3-triethoxysilyl-N-(1,3-dimethyl-butylidene) propylamine, N-phenyl-3-amino propyl trimethoxy silane, N-2(amino ethyl)3-amino propyl methyl dimethoxy silane, N-2(amino ethyl)3-amino propyl trimethoxy silane, N-2 (amino ethyl)3-aminopropyl triethoxy silane, 3-mercaptopropyl methyl dimethoxy silane and 3-mercaptopropyl trimethoxy silane.

This silane coupling agent is made from a mixture containing one or more of the above described materials. The necessary amount of silane coupling agent is dissolved in fluxing material such as methanol and ethanol, and water necessary for hydrolysis is added.

The fluxing material which can be used here includes lower alcohols such as ethanol, methanol, propanol and butanol, lower alkylcarboxylic acids such as formic acid and propionic acid, aromatic compound such as toluene and xylene, esters such as ethyl acetate and butyl acetate, cellosolves such as methyl cellsolve and ethyl cellsolve. The fluxing material is made from a mixture containing one or more of the above described materials. Furthermore, it may be used in a state of solution. In a case where it is difficult to solve the fluxing material in water, it is preferable to add acetic acid to make weak acid solution. Therefore, it is possible to increase hydrolysis of alkoxy silane group and water solubility.

If necessary, in solution of the silane coupling agent, alkoxy silane compound represented by $Si(OR^1)_4$ (wherein $R^1$ is alkyl of 1 to 4 carbon atoms) or $R^2_n Si(OR^3)_{4-n}$ (wherein $R^2$ is hydrocarbon radical of 1 to 6 carbon atoms, $R^3$ is alkyl of 1 to 4 carbon atoms and n is 1 to 3 integers) is added. The alkoxy silane compound of $Si(OR^1)_4$ includes tetramethoxy silane and tetraethoxy silane. The alkoxy silane compound of $R^2_n Si(OR^3)_{4-n}$ includes methyl trimethoxy silane, methyl triethoxy silane, dimethyl diethoxy silane, phenyl triethoxy silane, hexamethyl disilazane and hexyltrimethoxy silane.

The photocatalytic material of the present invention is formed by using solution obtained by dispersing photocatalytic particles in solution of silane coupling agent. Examples of the dispersed processing of photocatalytic particles include agitator with homo mixer or magnet stirrer, dispersed processing with ball mill, sand mill, high speed rotation mill or jet mill, and ultrasonic agitation.

The base substrate used in photocatalytic material of the present invention includes at least surface formed by resin. As the resin, synthetic resin and natural resin may be used. Examples of the resin include thermoplastic resin such as polyethylene resin, polypropylene resin, polystyrene resin, ABS (acrylonitrile butadiene styrene) resin, AS (acrylonitrile styrene) resin, EVA (ethylene vinyl acetate copolymer) resin, polymethylpentene resin, polyvinyl chloride resin, polyvinylidene chloride resin, polyacrylic methyl resin, polyvinyl acetate resin, polyamide resin, polyimide resin, polycarbonate resin, polyethylene terephthalate resin, polybutylene terephthalate resin, polyacetal resin, polyacrylate resin, polysulfone resin, polyvinylidene fluoride resin and PTFE (polytetrafluoroethylene), biodegradable resin such as polylactide resin, polyhydroxy butyrate resin, modified starch resin, polycaprolactone resin, polybutylene succinate resin, polybutylene adipate terephthalate resin, polybutylene succinate terephthalate resin and polyethylene succinate resin, thermosetting resin such as phenol resin, urea resin, melamine resin, unsaturated polyester resin, diallyl phthalate resin, epoxy resin, epoxy acrylate resin, silicone resin, acrylic urethane resin and urethane resin, elastomer such as silicone resin, polystyrene elastomer, polyethylene elastomer, polypropylene elastomer and polyurethane elastomer, natural resin such as lacquer and natural fabric such as cotton, hemp and silk.

The resin may have a shape according to intended purpose, for example, platy structure, film, fibriform structure, mesh, and granular structure. In the present invention, the shape of the resin is not limited to the above described shape. Furthermore, resin thin film may be formed on the surface of metallic materials such as aluminum, magnesium and iron or on the surface of inorganic materials such as glass and ceramic. The processing for forming the resin thin film includes lamination of film, coating such as spray coating, immersion coating and electrostatic coating, and printing such as screen printing and offset printing. This resin may be dyed with pigment and dye compound. Inorganic materials such as silica, alumina, diatomite and mica may be filled in the resin.

Radiation ray used in graft polymerization method according to the present invention includes alpha ray, beta ray, gamma ray, electron beam and ultraviolet ray. Gamma ray, electron beam and ultraviolet ray are preferably used for graft polymerization of the present invention.

The photocatalytic material of the present invention is produced through one of two methods that are so-called coincidence irradiation graft polymerization and so-called preirradiation graft polymerization.

In the coincidence irradiation graft polymerization, the solution of silane coupling agent in which the photocatalytic particles are dispersed is applied to the surface of the base substrate to which the photocatalytic particles are to be bonded. If necessary, fluxing materials are eliminated through drying by heating. Then, radiation ray such as gamma ray, electron beam and ultraviolet ray is irradiated to the surface of the base substrate to which the mixture of photocatalytic particles and silane coupling agent is applied. Therefore, the silane coupling agent and the photocatalytic particles are bonded to the surface of the base substrate through graft polymerization.

In the preirradiation graft polymerization, radiation ray such as gamma ray, electron beam and ultraviolet ray is irradiated to the surface of the base substrate to which the photocatalytic particles are to be bonded. And then solution of silane coupling agent in which the photocatalytic particles are dispersed are applied to the base substrate. Therefore, silane coupling agent reacts with the base substrate and the photocatalytic particles are fixed on the base substrate.

In order to carry out graft polymerization with silane coupling agent efficiently and uniformly, it is preferable to carry out hydrophilic processing on the surface of the base substrate by using corona discharge processing, plasma discharge processing, flame processing and chemical processing with oxidizing acid solution such as chrome acid and perchloric acid.

EXAMPLES

Hereinafter, examples of the present invention will be concretely described. The present invention is not limited to the following examples.

<Production of the Photocatalytic Material>

The photocatalytic material was produced by using electron beam irradiation device (electroncurtain type, CB250/15/180L, produced by IWASAKI ELECTRIC CO., LTD.).

Example 1

Vynil triethoxy silane (20 g, KBM-1003, produced by SHIN-ETSU CHEMICAL CO., LTD.) was dissolved in methanol (80 g) and then 7.3 g of water (equal to or larger than 3 mol equivalents with respect to silane compound) was added to hydrolyze a part of silane coupling agent. 4.0 g of titanium oxide particles (MTP-621, produced by ISHIHARA SANGYO CO., LTD.) serving as photocatalytic particles was added in the solution of silane coupling agent. And then titanium oxide particles were dispersed by using high speed rotation jet mill (W-MOTION, produced by M-TECHNIQUE CO., LTD.).

The surface of polyester film (RUMIRER, produced by TORAY CO., LTD.) 125 μm thick was subjected to corona discharge processing in the atmosphere. Thereto, solution of silane coupling agent in which titanium oxide particles were dispersed was applied with spray and was dried at 100 degrees for three minutes. Next, electron beam was irradiated to the polyester film to which the solution of silane coupling agent was applied in a manner that acceleration voltage is 200 kV and dosage of electron beam irradiation is 5 Mrad. Therefore, the photocatalytic material in which titanium oxide particles were bonded on the polyester film through silane coupling agent was produced.

Example 2

The photocatalytic material was produced in the same manner as in Example 1, except for using Meshcloth of 200 mesh which is formed by polyester filament of 55 μm in place of polyester film serving as base substrate used in example 1.

Example 3

10 g of 3-methacryloxy propyl trimethoxy silane (KBM-503, produced by SHIN-ETSU CHEMICAL CO., LTD.) was dissolved in methanol (90 g) and then 2.2 g of water (equal to or larger than 3 mol equivalents with respect to silane compound) was added to hydrolyze a part of silane coupling agent. In this solution of silane coupling agent, 4.0 g of titanium oxide particles (MTP-621, produced by ISHIHARA SANGYO CO., LTD.) serving as photocatalytic particles were added. And then, titanium oxide particles were dispersed by using high speed rotation jet mill (W-MOTION, produced by M-TECHNIQUE CO., LTD.).

The surface of polyester film (RUMIRER, produced by TORAY CO., LTD.) 125 μm thick was subjected to corona discharge processing in the atmosphere. And then solution of silane coupling agent in which titanium oxide particles were dispersed was applied to the polyester film with spray and was dried at 100 degrees for three minutes. Next, electron beam was irradiated to the polyester film to which the solution of silane coupling agent was applied in a manner that acceleration voltage is 200 kV and dosage of electron beam irradiation is 5 Mrad. Therefore, the photocatalytic material in which titanium oxide particles were bonded on the polyester film through silane coupling agent was produced.

Example 4

Water (5.8 g) was added to Methanol solution (100 g) containing 40% by mass of hydrochloride of N-(vynilbenzil)-2-aminoethyl-3-aminopropyl trimethoxy silane (KBM-575, produced by SHIN-ETSU CHEMICAL CO., LTD.) to hydrolyze a part of silane coupling agent. In this solution of silane coupling agent, 10.0 g of titanium oxide particles (BA-PW25, produced by ECODEVICE CO., LTD.) serving as photocatalytic particles were added. And then, titanium oxide particles were dispersed by using ball mill.

The surface of polyethylene film (produced by LINTEC CO., LTD.) 100 μm thick was subjected to corona discharge processing in the atmosphere. Thereto, solution of silane coupling agent in which titanium oxide particles were dispersed was applied with spray and was dried at 80 degrees for five minutes. Next, electron beam was irradiated to the polyethylene film to which the solution of silane coupling agent was applied in a manner that acceleration voltage is 200 kV and dosage of electron beam irradiation is 5 Mrad. Therefore, the photocatalytic material in which titanium oxide particles were bonded on the polyethylene film through silane coupling agent was produced.

Example 5

10 g of 3-glycidoxypropyl trimethoxy silane (KBM-403, produced by SHIN-ETSU CHEMICAL CO., LTD.) was dissolved in 90 g of methanol and thereto 2.3 g of water (equal to or larger than 3 mol equivalents with respect to silane compound) was added. Therefore, a part of silane coupling agent was hydrolyzed. In this solution of silane coupling agent, 3.0 g of titanium oxide particles (ST-01, ISHIHARA SANGYO CO., LTD.) serving as the photocatalytic particles were added. And then, titanium oxide particles were dispersed by using high speed rotation jet mill (W-MOTION, produced by M-TECHNIQUE CO., LTD.).

Thermosetting acrylic lacquer (MG1000, produced by KANSAI PAINT CO., LTD.) was applied to the aluminum plate 0.1 μm thick by using spray and was dried at 180 degrees for 30 minutes. Therefore, layer coated aluminum plate on which the coating 30 μm thick was formed was produced. Next, the surface of the layer coated aluminum plate was subjected to corona discharge processing in the atmosphere. Thereto, solution of silane coupling agent in which titanium oxide particles were dispersed was applied with spray and was dried at 100 degrees for three minutes. Next, electron beam was irradiated to the layer coated aluminum plate to which the solution of silane coupling agent was applied in a manner that acceleration voltage is 240 kV and dosage of electron beam irradiation is 10 Mrad. Therefore, the photocatalytic material in which titanium oxide particles were bonded on the layer coated aluminum plate through silane coupling agent was produced.

Comparative Example 1

The solution of silane coupling agent in which photocatalytic particles were dispersed and which was obtained in the same manner as in example 1 was applied to polyester film 100 μm thick by using spray and was dried at 100 degrees for 30 minutes. Therefore, photocatalytic material was produced.

Comparative Example 2

The solution of silane coupling agent in which photocatalytic particles were dispersed and which was obtained in the same manner as in example 5 was applied to layer coated aluminum plate obtained in example 5 by using spray and was dried at 150 degrees for 30 minutes. Therefore, photocatalytic material was produced.

<Evaluation of the Photocatalytic Material>

With respect to the photocatalytic materials produced in examples 1 to 5 and comparative examples 1 and 2, uniformity of coating including the photocatalytic particles were evaluated with visual examination. And adhesiveness of the coating including the photocatalytic particles was evaluated by the following method. After adhesive cellophane tape was attached to the surface of the photocatalytic material, the tape was removed.

Catalytic activity of each photocatalytic material was evaluated by determining quantity of the concentrations of the acetaldehyde before and after exposure to ultraviolet ray. First, each produced-photocatalytic material was inserted in the tetra pack and then 3 L of acetaldehyde having concentration of about 100 ppm was injected in the tetra pack. Next, it was left for about 30 minutes so that the concentration of acetaldehyde in the tetra pack becomes constant. And then, ultraviolet ray was irradiated to each photocatalytic material for 120 minutes with black light of 20 W (FL20SBLB, produced by TOSHIBA LIGHTING & TECHNOLOGY CO., LTD) so that light intensity of ultraviolet ray on the surface of the photocatalytic material is 1.0 mW/cm$^2$. The concentration of acetaldehyde in the tetra pack was measured with Acetaldehyde Gas Detector (produced by GASTEC CO., LTD.). The results obtained are represented by relative value wherein the concentration of acetaldehyde before exposure to ultraviolet ray is 100. The results obtained are shown in table 1.

As shown in table 1, with respect to the photocatalytic materials of the present invention produced through graft polymerization, the coating which includes photocatalytic particles and is formed on the base substrate, was uniform and was bonded tenaciously to the surface of the base substrate. On the other hand, with respect to the photocatalytic materials produced in comparative examples, the coating including photocatalytic particles was not uniform in the manner that the coating was formed partially. Furthermore, the coating including the photocatalytic particles was removed easily in the test with adhesive cellophane tape. Thus adhesive intensity of the coating was extremely low.

TABLE 1

|  | Uniformity | Adhesiveness | Degradation rate of acetaldehyde (%) |
|---|---|---|---|
| Example 1 | Uniform | Non-peeling | 96.1 |
| Example 2 | Uniform | Non-peeling | 96.7 |
| Example 3 | Uniform | Non-peeling | 98.9 |
| Example 4 | Uniform | Non-peeling | 97.3 |
| Example 5 | Uniform | Non-peeling | 98.1 |
| Comparative Example 1 | Non-Uniform | Peeling | 22.5 |
| Comparative Example 2 | Non-Uniform | Peeling | 19.1 |

INDUSTRIAL APPLICABILITY

In the photocatalytic material according to the present invention in which the photocatalytic particles are bonded to the surface of the resin base substrate through graft polymerization of silane compound, silanol group produced by hydrolyzing alkoxy group of silane compound is bonded tenaciously to the surface of the titanium oxide particles serving as the photocatalytic particles through dehydration condensation reaction. Furthermore, vinyl group, epoxy group, styryl group, methacrylo group, acryloxy group, isocyanate group, polysulfide group and the like of the silane compound are bonded through graft polymerization with radical produced on the surface of the resin base substrate by irradiating radiation ray. Since the photocatalytic particles are bonded tenaciously to the surface of the resin base substrate by chemical bonding through silane compound, the photocatalytic particles are less apt to shed even when the photocatalytic materials of the present invention is used in various environments. Thus the photocatalytic material has greater durability. Furthermore, dense coating of silicon oxide, which is produced by condensing silanol group formed through hydrolysis of alkoxy group, is formed between the photocatalytic particles and the resin base substrate. Since the dense coating of silicon oxide prevents the photocatalytic particles from contacting directly with the resin base substrate. Thus the surface of the resin base substrate is not subjected to the high oxidation-reduction action of the photocatalytic particles. Since the resin base substrate is not deteriorated by photocatalytic particles, the resin base substrate is not deteriorated deteriorate even when the photocatalytic material of the present invention is used over long. Thus the photocatalytic material of the present invention is extremely beneficial in terms of useful.

The invention claimed is:

1. A method of making a photocatalytic material comprising a base substance and photocatalytic particles bonded on the base substance by chemical bonding through a silane compound, wherein at least a surface of the base substance is made of resin, wherein the method comprises:

hydrolyzing a hydrolysable group of the silane compound to form a silanol group, bonding the silanol group to a surface of the photocatalytic particles through a dehydration reaction, applying the photocatalytic particles having the silane compound to the resin surface of the base substance to form a substantially uniform layer including the photocatalytic particles on the resin surface, bonding a reactive functional group of the silane compound through graft polymerization to a radical produced on the resin surface of the base substance by irradiating radiation ray.

2. The method according to claim 1, wherein the photocatalytic particles are applied to the resin surface of the base substance by coating.

* * * * *